United States Patent
Thomas (10) Patent No.: US 11,603,961 B2
(45) Date of Patent: Mar. 14, 2023

(54) INTERNALLY DAMPED CROSSBAR ASSEMBLY HAVING A FRICTION DAMPED ISOLATOR

(71) Applicant: Raytheon Company, Waltham, MA (US)

(72) Inventor: Sean G. Thomas, McKinney, TX (US)

(73) Assignee: Raytheon Company, Waltham, MA (US)

( * ) Notice: Subject to any disclaimer, the term of this patent is extended or adjusted under 35 U.S.C. 154(b) by 407 days.

(21) Appl. No.: 16/844,805

(22) Filed: Apr. 9, 2020

(65) Prior Publication Data

US 2021/0190263 A1   Jun. 24, 2021

Related U.S. Application Data (60) Provisional application No. 62/950,921, filed on Dec. 19, 2019.

(51) Int. Cl.
*F16M 13/02* (2006.01)
*B60R 11/04* (2006.01)
(Continued)

(52) U.S. Cl.
CPC ............ *F16M 13/02* (2013.01); *B60R 11/04* (2013.01); *F16F 3/12* (2013.01); *F16F 13/02* (2013.01);
(Continued)

(58) Field of Classification Search
CPC . F16M 13/02; B60R 11/04; B60R 2011/0049; F16F 3/12; F16F 13/02;
(Continued)

(56) References Cited

U.S. PATENT DOCUMENTS

| 704,403 A | * | 7/1902 | Thill | ...................... | H02G 3/125 396/428 |
| 1,824,085 A | * | 9/1931 | Karnes | ................... | G03B 15/00 396/13 |

(Continued)

FOREIGN PATENT DOCUMENTS

| CN | 100585052 C | 1/2010 |
| EP | 2798314 A1 | 11/2014 |

(Continued)

OTHER PUBLICATIONS

Leonardo Drs, Mast Muonted Sight (MMS), https://www.leonardodrs.com/media/3296/mms_datasheet.pdf, to the best of applicant's knowledge article was available before the application filing date, 2 pages, Melbourne, Florida.

(Continued)

*Primary Examiner* — Terrell L McKinnon
*Assistant Examiner* — Michael McDuffie (57) ABSTRACT

A crossbar assembly for facilitating isolation of a sensor assembly from vibration of a payload mounting system on a vehicle comprising an outer crossbar segment, an inner crossbar segment, an isolator, and a damper. The outer crossbar segment comprises a payload mount interface operable to mount to a payload mount, and an outer isolator interface operable to mount to an isolator. The inner crossbar segment comprises a structure interface to mount to a structure, and an inner isolator interface operable to mount to the isolator. The isolator can be supported by the outer and inner crossbar segments. The damper is adjacent the isolator. The isolator is operable to deform in response to relative movement between the outer and inner crossbar segments. The isolator operates to partially decouple the outer crossbar segment from the inner crossbar segment and the damper (Continued)

dampens vibrations propagating between the outer and inner crossbar segments.

15 Claims, 9 Drawing Sheets

(51) Int. Cl.
  *F16F 13/02* (2006.01)
  *F16F 3/12* (2006.01)
  *H04N 5/225* (2006.01)
  *B60R 11/00* (2006.01)
  *F16F 13/04* (2006.01)

(52) U.S. Cl.
  CPC .... *H04N 5/2253* (2013.01); *B60R 2011/0049* (2013.01); *F16F 13/04* (2013.01); *F16F 2224/02* (2013.01); *F16F 2224/025* (2013.01); *F16F 2224/0208* (2013.01); *F16M 2200/00* (2013.01)

(58) Field of Classification Search
  CPC ............... F16F 13/04; F16F 2224/02; F16F 2224/0208; F16F 2224/025; F16F 2200/00; H04N 5/2253
  USPC ...... 396/13, 428, 12; 248/274.1, 660, 184.1, 248/550, 637
  See application file for complete search history.

(56) References Cited

U.S. PATENT DOCUMENTS

| | | | |
|---|---|---|---|
| 2,378,744 A * | 6/1945 | Annen | G01C 19/28 |
| | | | 250/230 |
| 3,385,542 A * | 5/1968 | Enemark | F04B 39/127 |
| | | | 417/363 |
| 3,773,285 A | 11/1973 | Morrill | |
| 4,318,522 A | 3/1982 | Appleberry | |
| 4,341,452 A * | 7/1982 | Korling | F16M 11/105 |
| | | | 396/428 |
| 4,498,038 A | 2/1985 | Malueg | |
| 4,625,938 A | 12/1986 | Brown | |
| 4,669,843 A * | 6/1987 | Bozzolato | B64D 47/08 |
| | | | 396/419 |
| 5,184,521 A | 2/1993 | Tyler | |
| 5,368,271 A | 11/1994 | Kiunke et al. | |
| 5,897,223 A | 4/1999 | Tritchew et al. | |
| 6,003,829 A * | 12/1999 | Martinsson | F16F 1/376 |
| | | | 248/638 |
| 6,454,229 B1 | 9/2002 | Voigt et al. | |
| 6,484,978 B2 | 11/2002 | Voigt et al. | |
| 7,000,883 B2 | 2/2006 | Mercadal et al. | |
| 7,324,747 B2 | 1/2008 | Kempas | |
| 7,561,784 B2 * | 7/2009 | Wescott | G01C 21/18 |
| | | | 396/13 |
| 7,699,691 B1 * | 4/2010 | Voigt | H05K 7/20154 |
| | | | 165/104.33 |
| 8,100,377 B1 * | 1/2012 | Blackburn | G02B 7/182 |
| | | | 248/278.1 |
| 8,844,896 B2 * | 9/2014 | Pettersson | H04N 5/23258 |
| | | | 248/646 |
| 9,348,197 B2 * | 5/2016 | Lewis | F16M 11/123 |
| 9,765,925 B2 | 9/2017 | Lewis | |
| 10,906,636 B2 | 2/2021 | Welsh et al. | |
| 2002/0158181 A1 | 10/2002 | Carter et al. | |
| 2002/0158182 A1 | 10/2002 | Carter et al. | |
| 2005/0031335 A1 | 2/2005 | Itzkowitz | |
| 2008/0158371 A1 | 7/2008 | Trescott | |
| 2009/0148150 A1 * | 6/2009 | Valles Navarro | F16M 13/00 |
| | | | 396/428 |
| 2009/0216394 A1 | 8/2009 | Heppe et al. | |
| 2010/0234844 A1 | 9/2010 | Edelhauser et al. | |
| 2014/0176717 A1 * | 6/2014 | De Paschoal | B60R 11/04 |
| | | | 348/148 |
| 2016/0139494 A1 * | 5/2016 | Tien | G03B 17/561 |
| | | | 396/428 |
| 2017/0175948 A1 | 6/2017 | Zeise et al. | |
| 2018/0004064 A1 * | 1/2018 | Kim | G03B 37/04 |
| 2020/0173511 A1 * | 6/2020 | Miller | F16F 7/116 |
| 2020/0307826 A1 * | 10/2020 | Zhang | F16M 13/022 |
| 2021/0188187 A1 | 6/2021 | Miller | |
| 2021/0190170 A1 * | 6/2021 | Miller | G03B 17/561 |
| 2021/0190171 A1 | 6/2021 | Miller et al. | |
| 2021/0190263 A1 * | 6/2021 | Thomas | B60R 11/04 |

FOREIGN PATENT DOCUMENTS

| | | |
|---|---|---|
| EP | 3220006 A1 | 9/2017 |
| JP | 2000-214745 A | 8/2000 |
| JP | 2002-154491 A | 5/2002 |
| JP | 5090293 B2 | 12/2012 |
| KR | 101362926 B1 | 2/2014 |
| KR | 101979293 B1 | 5/2019 |
| WO | WO 1996/02770 A1 | 2/1996 |
| WO | WO 2015/149079 A1 | 10/2015 |
| WO | WO 2017/179160 A1 | 10/2017 |

OTHER PUBLICATIONS

International Search Report for International Application No. PCT/US2020/056126 dated Feb. 3, 2020, 10 pages.
International Search Report for International Application No. PCT/US2020/056135 dated Feb. 11, 2020, 14 pages.
International Search Report for International Application No. PCT/US2020/056148 dated Feb. 16, 2021, 14 pages.
International Search Report for International Application No. PCT/US2020/056155 dated Feb. 23, 2021, 32 pages.
International Search Report for International Application No. PCT/US2020/056167 dated Feb. 12, 2021, 15 pages.

* cited by examiner

INTERNALLY DAMPED CROSSBAR ASSEMBLY HAVING A FRICTION DAMPED ISOLATOR

RELATED APPLICATIONS

This application claims the benefit of U.S. Provisional Application No. 62/950,921, filed Dec. 19, 2019, which is incorporated by reference herein in its entirety.

BACKGROUND

Sensors, such as imaging sensors, can be mounted to mobile vehicles, such as aircraft, land vehicles, and watercraft using a payload system mount rotatably coupled to the vehicle. The payload system mount with its rotatable coupling can include at least two rotating joints. For example, a first rotating joint can allow azimuth rotation of the payload system mount while a second rotating joint coupled to the first rotating joint can allow elevational rotation of the payload system mount. A crossbar system can be coupled to the payload system mount and can support a sensor assembly (e.g., an imaging assembly or system) in isolation. The sensor assembly can be mounted at a central location of the crossbar system and a first and second end of the crossbar system can be coupled to the payload system mount. Thus, the first rotating joint can be configured to facilitate azimuth rotation of the sensor assembly, and the second rotating joint can be configured to facilitate elevational rotation of the sensor assembly.

The crossbar system is configured to transmit motion of the payload system mount to the sensor assembly. However, it is not desirable to transmit all motion to the sensor assembly. For example, sensors can be sensitive to vibration and sudden acceleration (e.g., due to shock or other loads) and can experience a loss of resolution when subjected to these. For example, vehicles experience accelerations and vibrations during operation that can be detrimental to the functioning of the sensor. These accelerations and vibrations, if not isolated and damped, can be transmitted from the vehicle through the payload mount system to the sensor assembly and the sensor payload.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

In one example, disclosed is a crossbar system for facilitating isolation of a sensor assembly from external vibration of a structure. The crossbar system comprises a first crossbar assembly, a second crossbar assembly, and a payload mount. The first crossbar assembly comprises a first structure interface operable to mount to a structure, a first payload mount interface operable to couple to a payload mount, a first isolator coupling the first structure interface and the first payload mount interface, and a first damper between the first structure interface and the first payload mount interface. The first isolator is operable to partially decouple the first structure interface and the first payload mount interface and the first damper is operable to dampen vibrations propagating through the first crossbar assembly. The second crossbar assembly comprises a second structure interface operable to mount to the structure, a second payload mount interface operable to couple to a payload mount, a second isolator coupling the second structure interface and the second payload mount interface, and a second damper between the second structure interface and the second payload mount interface. The second isolator is operable to partially decouple the second structure interface and second first payload mount interface and the second damper is operable to dampen vibrations propagating through the second crossbar assembly. The payload mount is coupled to the first payload mount interface and the second payload mount interface and is operable to mount a sensor assembly.

In accordance with a more detailed aspect, the first crossbar assembly can further comprise a first outer crossbar segment coupled to the first structure interface and the first isolator, and a first inner crossbar segment coupled to the first payload mount interface and the first isolator, and the second crossbar assembly can further comprise a second outer crossbar segment coupled to the second structure interface and the second isolator, and a second inner crossbar segment coupled to the second payload mount interface and the second isolator.

In accordance with a more detailed aspect, each of the first and second isolators can comprise an inner ring, an outer ring concentric with the inner ring, and a spring portion coupling the inner ring to the outer ring.

In accordance with a more detailed aspect, each of the first and second dampers can comprise a metallic mesh adjacent the spring portion.

In accordance with a more detailed aspect, each of the first and second dampers can comprise an elastic disk adjacent the spring portion.

In accordance with a more detailed aspect, the first inner crossbar segment can be coupled to the inner ring and the first outer crossbar segment can be coupled to the outer ring.

In accordance with a more detailed aspect, the spring portion can comprise a plurality of curvilinear members, such as a plurality of S shaped members.

Also disclosed is a crossbar assembly for facilitating isolation of a sensor assembly from external vibration of a payload system mount on a vehicle. The crossbar assembly comprises an outer crossbar segment, an inner crossbar segment, an isolator, and a damper. The outer crossbar segment comprises a payload mount interface operable to mount to a payload mount, and an outer isolator interface operable to mount to an isolator. The inner crossbar segment can be moveable relative to the outer crossbar segment in multiple degrees of freedom. The inner crossbar segment comprises a structure interface operable to mount to a structure, and an inner isolator interface operable to mount to the isolator. The isolator can be supported by the outer and inner crossbar segments. The isolator comprises a spring portion operable to deform in response to relative movement between the outer and inner crossbar segments. The damper is adjacent the spring portion. The isolator operates to partially decouple the outer crossbar segment from the inner crossbar segment and the damper operate to dampen vibrations propagating between the outer and inner crossbar segments.

In accordance with a more detailed aspect, the isolator can comprise an inner ring and an outer ring concentric with the inner ring, wherein the spring portion couples the inner ring to the outer ring.

In accordance with a more detailed aspect, the inner ring can be coupled to the outer isolator interface and the second can be is coupled to the inner isolator interface.

In accordance with a more detailed aspect, the damper can comprise a disk formed of a metallic mesh.

In accordance with a more detailed aspect, the damper can comprise an elastomer disk.

In accordance with a more detailed aspect, the spring portion can comprise a plurality of curvilinear members, such as a plurality of S shaped members.

Also disclosed is a payload system mount comprising a base structure, a support structure rotatably coupled to the base structure, a crossbar system, and a sensor assembly. The crossbar system comprises a first crossbar assembly, a second crossbar assembly, and a payload mount. The first crossbar assembly comprises a first structure interface coupled to the support structure, a first payload mount interface operable to couple to a payload mount, a first isolator between the first structure interface and the first payload mount interface, and a first damper adjacent the first isolator. The first isolator is operable to partially decouple the first structure interface and the first payload mount interface and the first damper is operable to vibrations propagating through the first crossbar. The second crossbar assembly comprises a second structure interface coupled to the support structure, a second payload mount interface operable to couple to the payload mount, and a second isolator between the second structure interface and the second payload mount interface. The second isolator is operable to partially decouple the first structure interface and the first payload mount interface and the second damper is operable to dampen vibrations propagating through the second crossbar. The payload mount is coupled to the first payload mount interface and the second payload mount interface. The sensor assembly is coupled to the payload mount and comprises at least one sensor.

In accordance with a more detailed aspect, the first crossbar assembly can further comprise a first outer crossbar segment coupled to the first structure interface and the first isolator, and a first inner crossbar segment coupled to the first payload mount interface and the first isolator, and the second crossbar assembly can further comprise a second outer crossbar segment coupled to the second structure interface and the second isolator, and a second inner crossbar segment coupled to the second payload mount interface and the second isolator.

In accordance with a more detailed aspect, each of the first and second isolators can comprise an inner ring, an outer ring concentric with the inner ring, and a spring portion coupling the inner ring to the outer ring.

In accordance with a more detailed aspect, each of the first and second dampers can comprise a metallic mesh adjacent the spring portion.

In accordance with a more detailed aspect, each of the first and second dampers can comprise an elastomer disk adjacent the spring portion.

In accordance with a more detailed aspect, the first inner crossbar segment can be coupled to the inner ring and the first outer crossbar segment can be coupled to the outer ring.

In accordance with a more detailed aspect, the spring portion can comprise a plurality of curvilinear members, such as a plurality of S shaped members.

Figure 1:
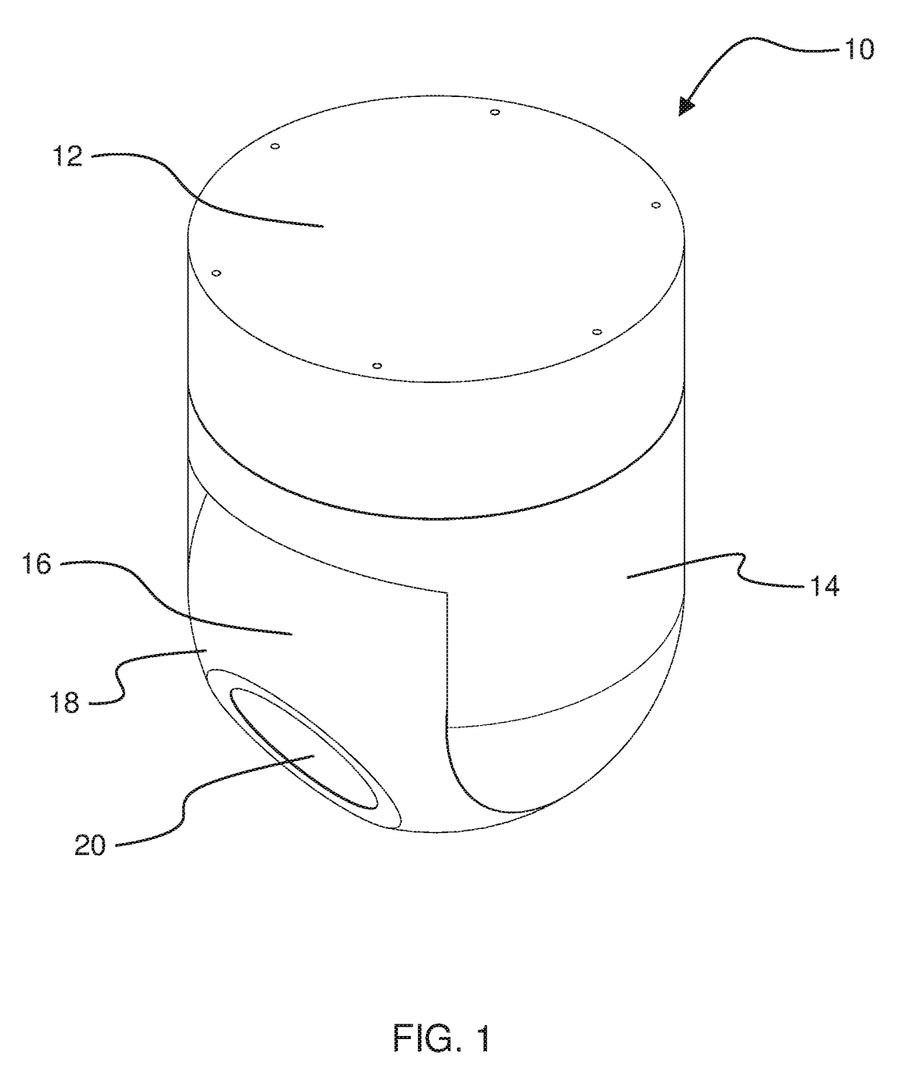
FIG. 1 illustrates an isometric view of a payload mounting system in accordance with an example of the present disclosure.
Figure 2:
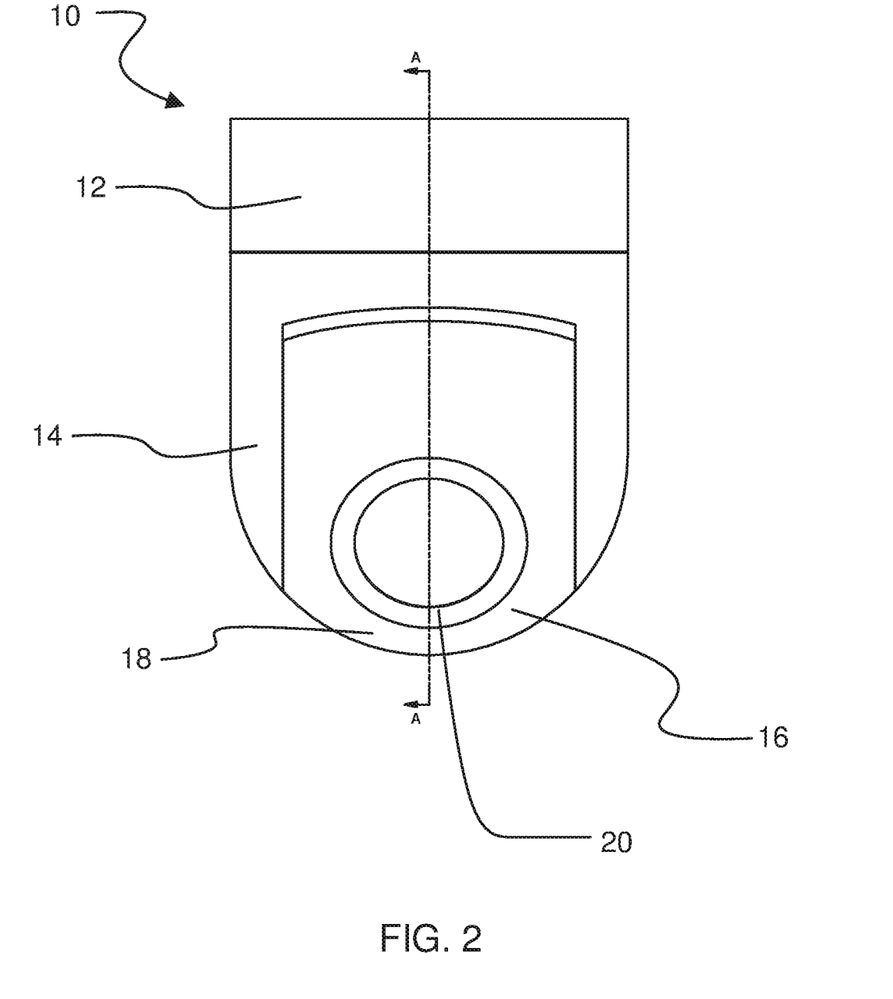
FIG. 2 illustrates a front view of the payload mounting system of FIG. 1.

To further describe the present technology, examples are now provided with reference to the figures. FIG. 1 illustrates an isometric view of a payload system mount 10 in accordance with an example of the present disclosure and FIG. 2 illustrates a front view of the payload system mount 10 of FIG. 1. With reference to FIGS. 1 and 2, the exemplary payload system mount 10 can comprise a turret mounted to a vehicle, and that is operable to support a payload, such as a sensor assembly having a sensor (e.g., an imaging sensor (e.g., a camera)), wherein the payload is supported by a crossbar system (discussed below). The turret can comprise a base 12 which can be coupled to the vehicle. A coarse azimuth platform 14 can be rotatably coupled to the base 12, and a coarse elevation platform 16 can be rotatably coupled to the coarse azimuth platform 14. The coarse elevation platform 16 can include a shell 18, which can house the payload in the form of the sensor assembly, including the sensor, and a crossbar system suspending and isolating the sensor assembly payload. A window 20 can be positioned at an outer surface of the shell 18 and provides transparent access to the sensor assembly, as well as facilitates a field of view of the sensor assembly through the payload system mount 10. For example, the sensor assembly can include a visual sensor, and the window 20 can be configured to be transparent to visible light. In another example, the sensor assembly can include a thermal radiation sensor, and the window 20 can be configured to be transparent to infrared radiation. In addition, the visual sensor, as mounted within the payload system mount 10, can be configured to sense or image objects through the window 20 that are within its field of view.

The payload system mount 10, and particularly the base 12, can be mounted or coupled to the vehicle using conventional techniques, such as bolted fasteners, weldments, or any other means as will be appreciated by those skilled in the art. Although the payload system mount 10 of FIGS. 1 and 2 is shown extending downward, in other examples the payload system mount 10 can be mounted so as to extend laterally or upward. The coarse azimuth platform 14 can be rotatably coupled to the base 12. For example, the coarse azimuth platform 14 can have a turntable type mount (not shown) rotatably coupling the coarse azimuth platform 14 to the base 12. In the example of FIGS. 1 and 2, the turntable mount can effectuate relative movement between the coarse azimuth platform 14 and the base 12 about a substantially vertical axis providing azimuthal rotation. The coarse azimuth platform 14 can be actuated using common actuators, such as electric actuators, hydraulic actuators, and others as will be appreciated and apparent to those skilled in the art.

The coarse elevation platform 16 can be rotatably coupled to the coarse azimuth platform 14. The coarse elevation platform 16 can be coupled or mounted to the coarse azimuth platform 14 by a rotating joint to effectuate movement between the coarse elevation platform 16 and the coarse azimuth platform 14. In the example of FIG. 1, the coarse elevation platform 16 can rotate relative to the coarse azimuth platform 14 about an axis that is substantially perpendicular to the axis of rotation of the coarse azimuth platform 14 relative to the base 12. For example, when the coarse azimuth platform 14 rotates about a vertical axis (from the perspective shown in FIGS. 1 and 2), the coarse elevation platform 16 can rotate about a horizontal axis.

Although FIGS. 1 and 2 illustrate the payload system mount 10 as comprising a turret type of payload system mount, this is not intended to be limiting in any way. Indeed, those skilled in the art will recognize other types of payload system mounts in which the crossbar system described herein can be used and supported for isolating a payload supported by the crossbar system. For example, an alternative configuration would be embedded behind a conformal window on the outside of a platform. Angular travel would be limited to the extents of travel of the spherical joint between the payload interface and the crossbar system. Need for vibration isolation would be the reason for having the interface between the sensor and the vehicle. Another alternative would be a pod configuration, which is essentially a turret mounted with the azimuth axis horizontal and identified as the "roll" axis.

Figure 3:
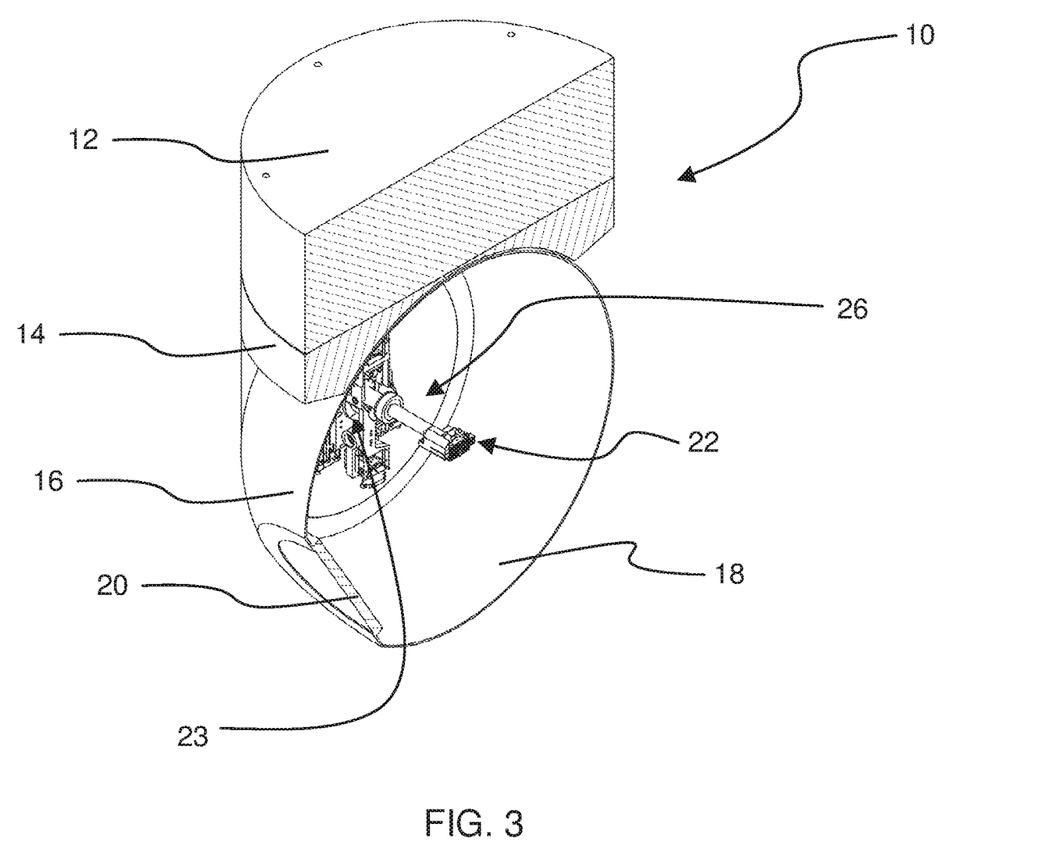
FIG. 3 illustrates an isometric, cross-sectional view of the payload mounting system of FIG. 1, taken along line AA of FIG. 2.

FIG. 3 illustrates a cross section of the payload system mount 10 of FIGS. 1 and 2, taken along line AA of FIG. 2. As shown, the payload system mount 10 can comprise a base structure, such as coarse azimuth platform 14, a support structure such as coarse elevation platform, and a crossbar system 26 in support of a payload mount 22. The crossbar system 26 can be coupled to the support structure of the payload system mount 10 such that rotation of the support structure relative to the base structure results in rotation of the crossbar system 26 and in turn a sensor assembly (and sensor) coupled to the payload mount 22. In some examples, the crossbar system 26 can be coupled to the coarse elevation platform 16 using conventional fastening techniques, such as threaded fasteners, adhesives, weldments, and others. The crossbar system 26 can span a width of the coarse elevation platform 16, such that the crossbar system 26 is suspended only at the distal ends 23 of the crossbar system 26.

Figure 4:
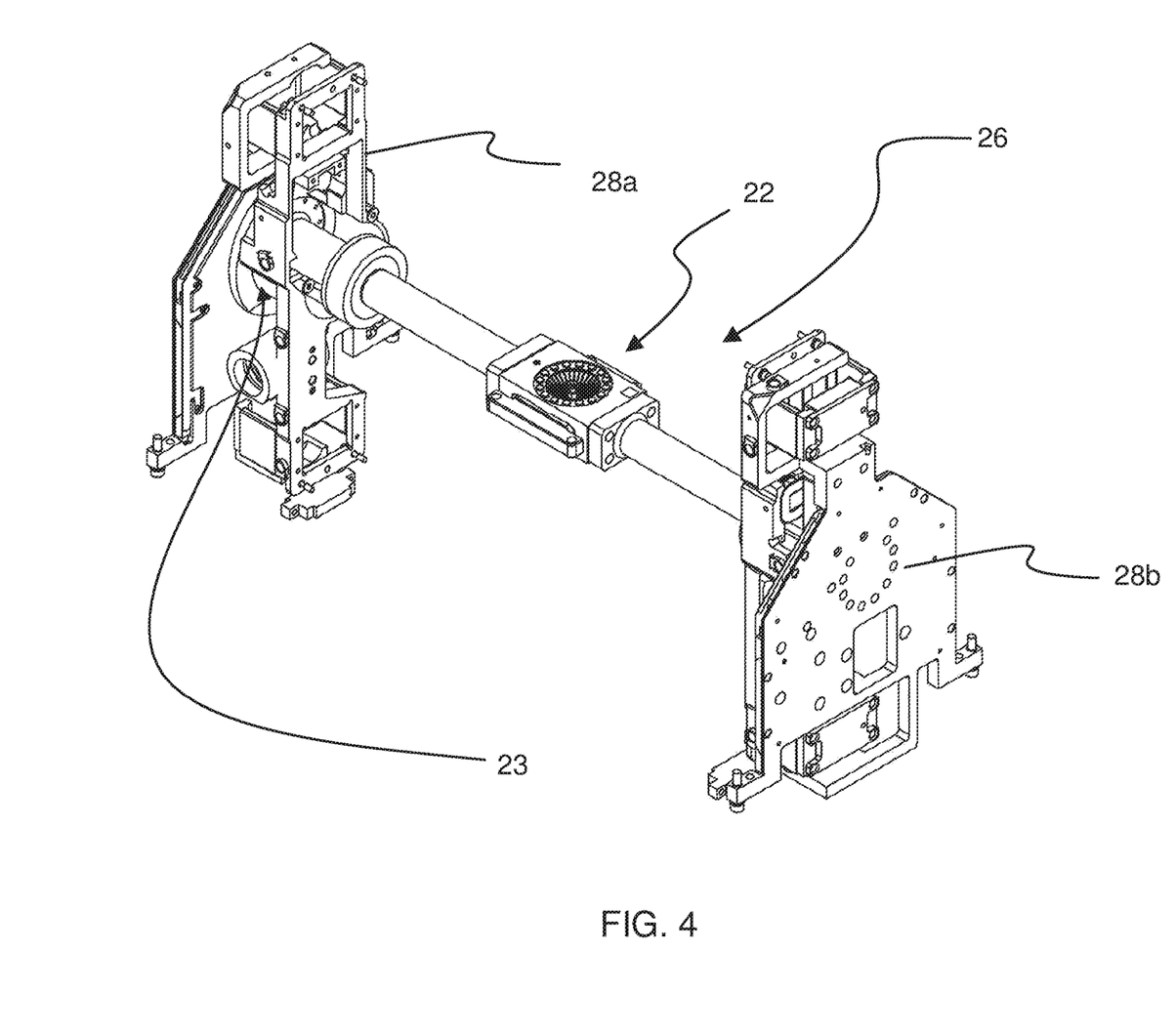
FIG. 4 illustrates an isometric view of a crossbar system and a support structure of the payload mounting system of FIG. 1.

FIG. 4 illustrates the crossbar system 26 and first and second portions 28a, 28b of the support structure. The first and second portions 28a, 28b can be a component of the coarse elevation platform 16 of FIG. 3. In some examples, the support structure, including first and second portions 28a, 28b, can rotate with the coarse elevation platform 16. Thus, rotation of the coarse elevation platform 16 can cause the crossbar system 26 to rotate. Additionally, vibrations of a vehicle may be transmitted to the support structure. For example, referring to FIG. 1, vehicle vibrations can be transmitted from a vehicle to the base 12, from the base 12 to the coarse azimuth platform 14, from the coarse azimuth platform 14 to the coarse elevation platform 16, and from coarse elevation platform 16 to the crossbar system 26. Thus, the crossbar system 26 can experience vibrations at each distal end 23 where the crossbar system 26 mounts to the first and second portions 28a, 28b of the support structure. As will be described in greater detail below, the crossbar system 26 facilitates isolation of the sensor assembly mounted to the payload mount 22 from external vibrations propagating from the support structure and through the crossbar system, such that the external vibrations are damped, thus having little or no effect on the payload mount 22 and the payload mounted thereto.

Figure 5:
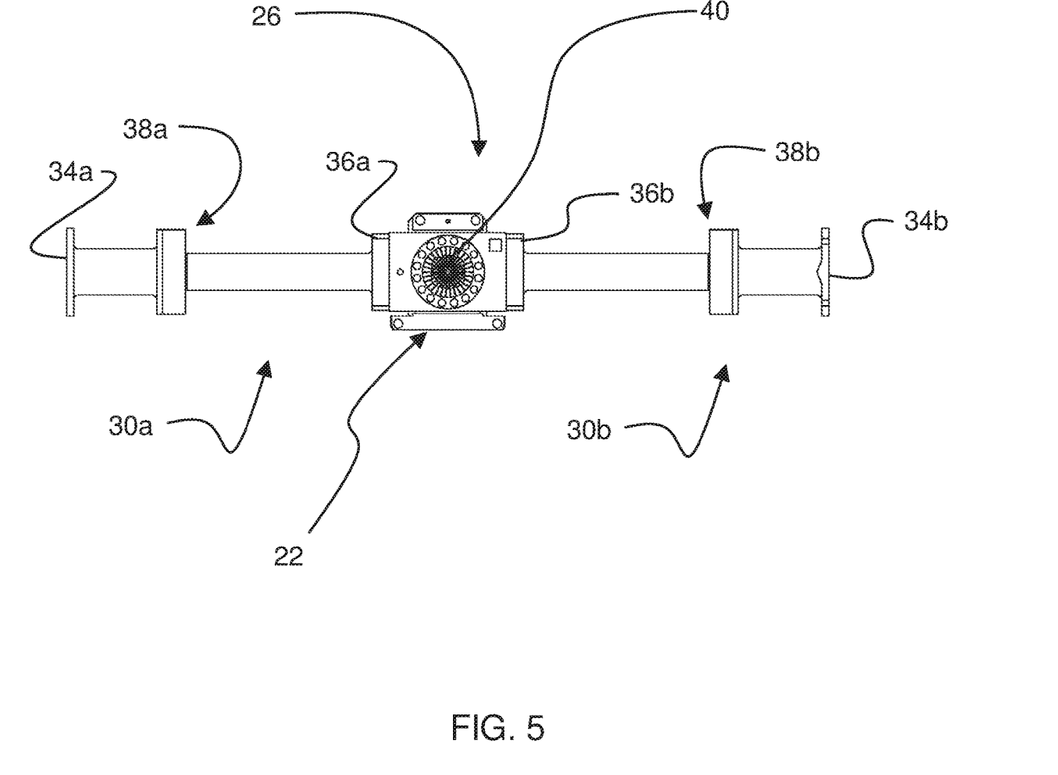
FIG. 5 illustrates a top view of the crossbar system shown in FIG. 4 with the support structure not shown.

FIG. 5 illustrates the crossbar system 26 of FIG. 4 separated from the first and second portions 28a, 28b of the support structure. In the example shown, the crossbar system 26 comprises a first crossbar assembly 30a, a second crossbar assembly 30b, and a payload mount 22. The first crossbar assembly 30a comprises a first structure interface 34a at a distal end, a first payload mount interface 36a at a proximal end, a first isolator 38a supported between the first structure interface 34a and the first payload mount interface 36a, and a first damper (see damper 64 of FIG. 10) positioned adjacent the isolator 38a. The second crossbar assembly 30b comprises a second structure interface 34b, a second payload mount interface 36b, a second isolator 38b supported between the second structure interface 34b and the second payload mount interface 36b, and a second damper (see damper 64 of FIG. 10) positioned adjacent the second isolator 38b.

The payload mount 22 can be coupled to the first payload mount interface 36a of the first crossbar assembly 30a, and to the second payload mount interface 36b of the second crossbar assembly 30b. The payload mount 22 can comprise a spherical joint (e.g., see spherical joint 40) or other joint operable to mount or otherwise support a sensor assembly. In one example, the payload mount 22 can comprise a cardan joint, such as the cardan joint described in U.S. patent application Ser. No. 16/721,662, filed Dec. 19, 2019, which is incorporated by reference herein in its entirety, wherein the cardan joint can comprise a suspension interface yoke that physically couples to the first and second payload mount interfaces 36a, 36b of the first and second crossbar assemblies 30a, 30b, respectively, and wherein the suspension interface yoke supports an inner assembly (e.g., a flexure, a payload interface assembly as part of a 3-axis gimbal, or others) that supports the sensor assembly (including the sensor). The payload mount 22 can enable the sensor assembly to adjust the positioning of a sensor relative to the coarse elevation platform 16. Thus, the coarse azimuth platform 14 and the coarse elevation platform 16 can provide coarse movement to the payload mount 22, which can enable the sensor assembly to make fine movements.

In some examples, the first crossbar assembly 30a and the second crossbar assembly 30b can be matching pairs having the same configuration, and that operate together to support, in a suspended state, the payload mount 22 (and the sensor assembly supported on the payload mount 22). For ease of discussion, the first crossbar assembly 30a of the crossbar system 26 will be described further with the understanding that the second crossbar assembly 30b can have the same configuration.

Figure 6:
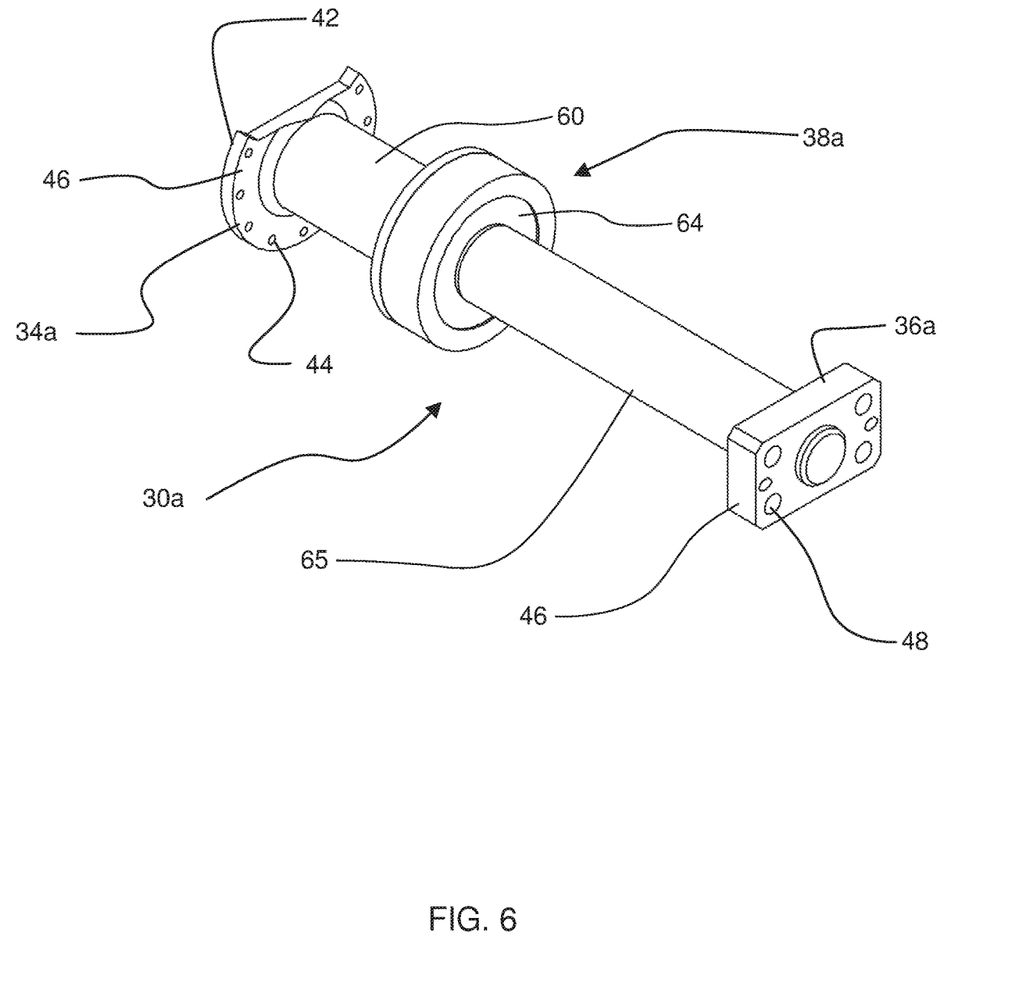
FIG. 6 illustrates an isometric view of a crossbar assembly of the crossbar system shown in FIG. 4.

FIG. 6 illustrates the crossbar assembly 30a removed from the support structure and the payload mount 22. The structure interface 34a is operable to mount to the support structure, such as first portion 28a of FIG. 4. The structure interface 34a can comprise a flange 42 having features, such as holes 44 or threaded holes, that align with corresponding features of the support structure. The features of the flange 42 and the support structure can then be used to secure the crossbar assembly 30a to the support structure. For example, the structure interface 34a can be secured to the support structure by threading a bolt (not depicted) through a hole 44 of the flange 42 and into a threaded aperture or socket of the support structure. The payload mount interface 36a is operable to couple to a payload mount, such as the payload mount 22 of FIG. 5. The payload mount interface 36a can comprise a flange 46 extending from and supported by an end of an inner crossbar segment 65. The flange 46 can comprise features, such as holes 48 or threaded holes that align with corresponding features of the payload mount 22. The features of the flange 46 can then be used to secure the crossbar assembly 30a to the payload mount 22. For example, the payload mount 22 can be secured to the payload mount interface 36a by threading a bolt (not depicted) through a hole 48 of the flange 46 and into a threaded aperture or socket of the payload mount 22. The flange 46 can be integrally formed with the inner crossbar segment 65, or the flange 46 can comprise a separate component coupled to the inner crossbar segment 65.

Figure 7:
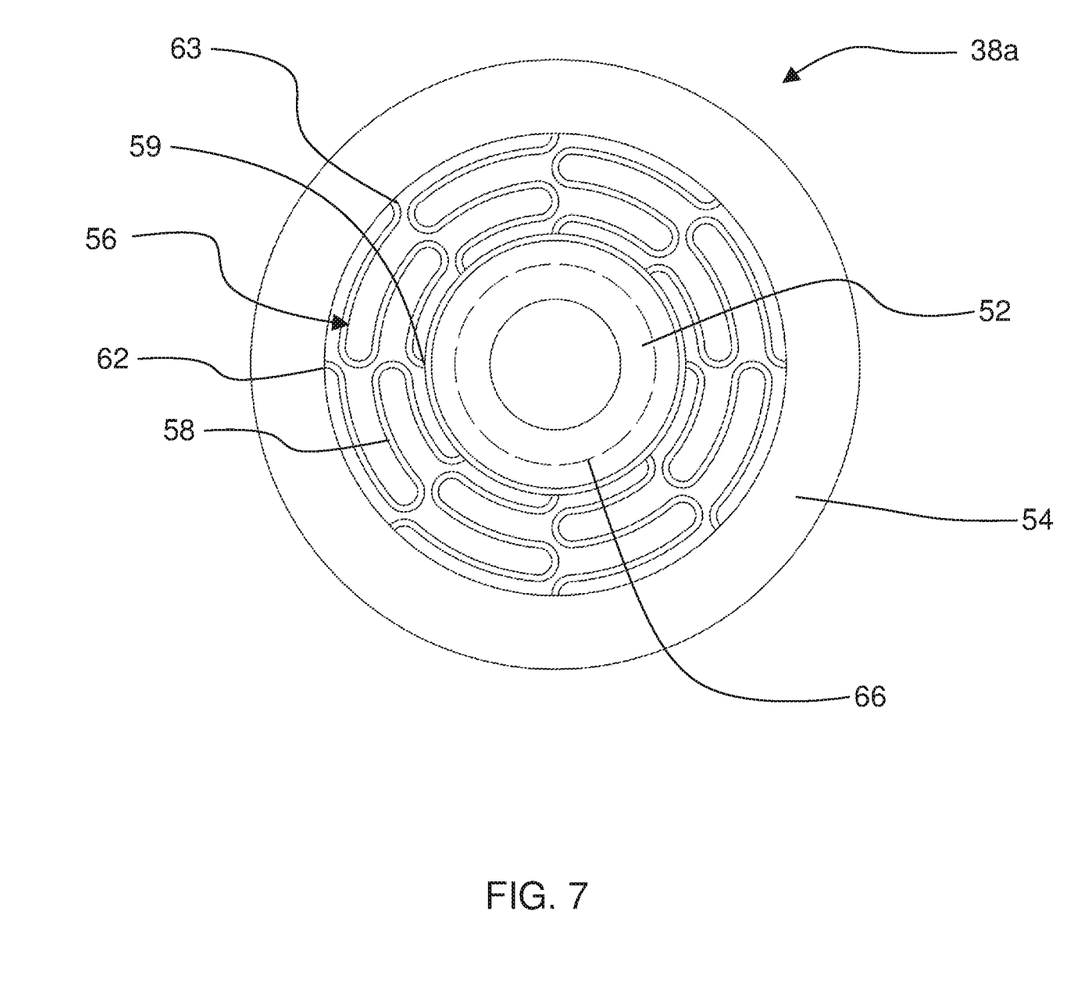
FIG. 7 illustrates side view of an isolator of the crossbar assembly shown in FIG. 6.

FIG. 7 illustrates an example isolator 38a removed from the crossbar assembly 30a. The isolator 38a can comprise an inner ring 52, an outer ring 54 concentric with the inner ring 52, and a spring portion 56 coupling the inner ring 52 to the outer ring 54. The spring portion 56 can be operable to deform in response to relative movement between the inner and outer rings 52, 54. In some examples, the spring portion 56 can comprises a plurality of thinned sections 58 of material having a curvilinear configuration (e.g., an "S" shape) with a first end 59 coupled to the inner ring 52 and a second end 63 coupled to the outer ring 54. The spring portion 56 can be elastically deformable such that the spring portion 56 retains the relative positioning between the inner and outer rings 52, 54 after a load causing relative movement between the inner and outer rings 52, 54 is removed. In some examples, the inner ring 52, the outer ring 54 and the spring portion 56 can be formed of metal. Example materials that can be used for the inner ring 52, and outer ring 54 and the spring portion 56 can be steel, aluminum, titanium, various alloys. Depending upon the loads these components will be subject to, polymers or plastics can be used.

Figure 8:
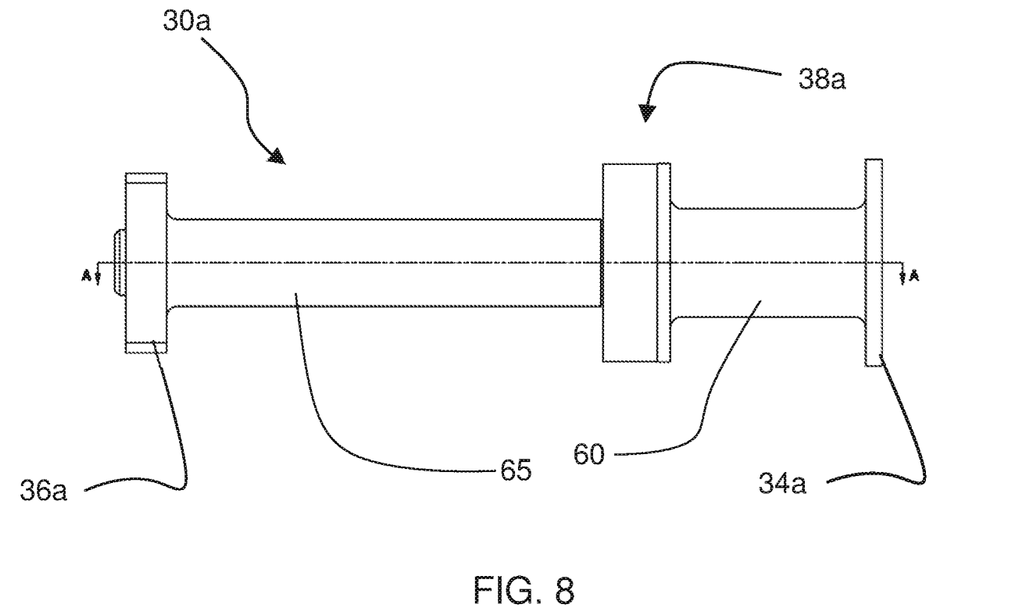
FIG. 8 illustrates a front view of the crossbar assembly shown in FIG. 6.
Figure 9:
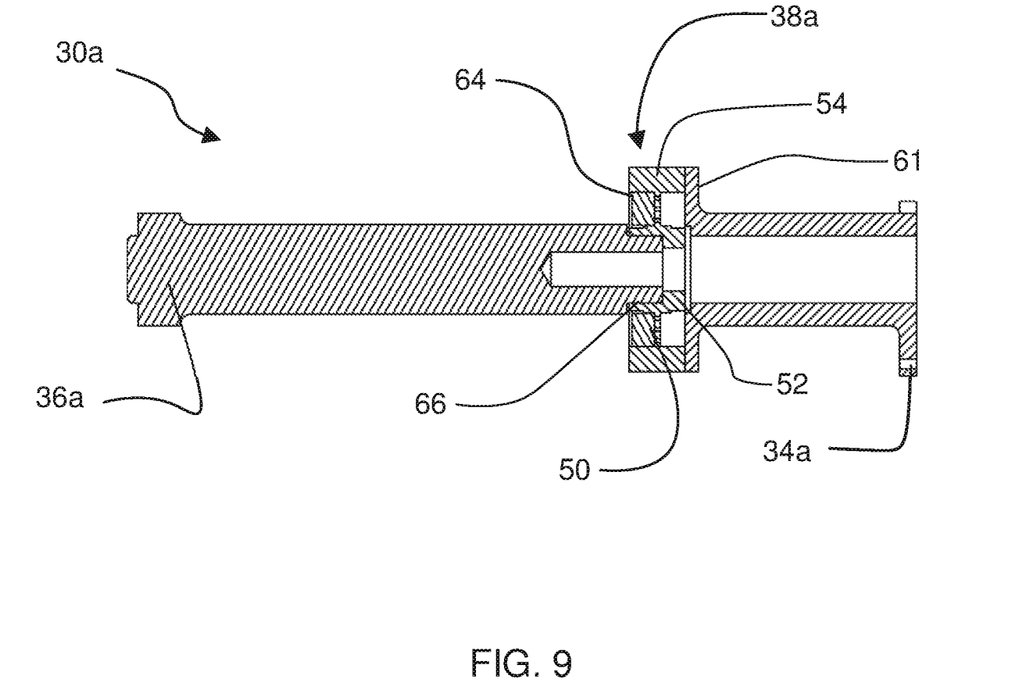
FIG. 9 illustrates a cross-sectional view of the crossbar assembly shown in FIG. 6, taken about line AA of FIG. 8.
Figure 10:
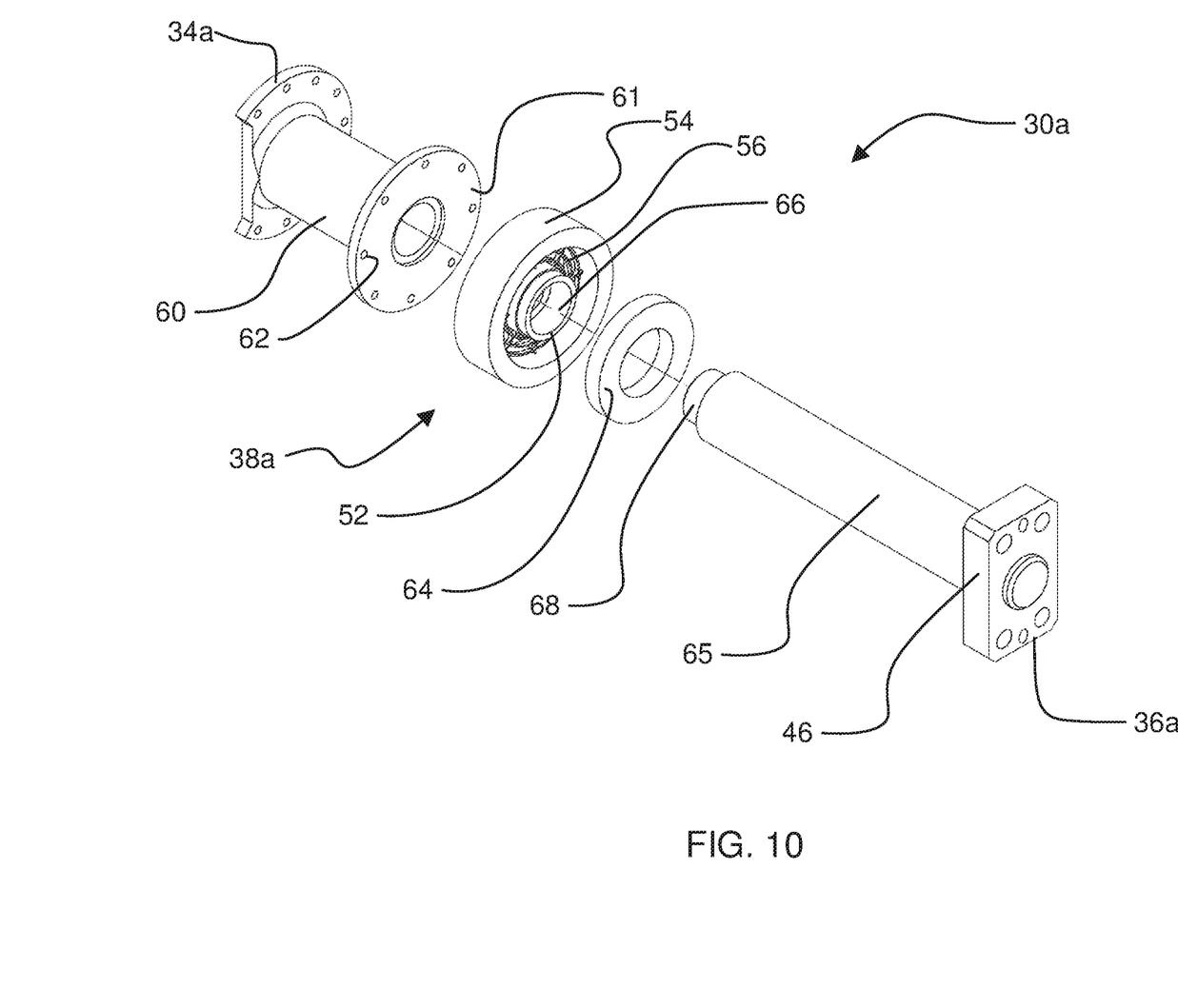
FIG. 10 illustrates an exploded isometric view of the crossbar assembly shown in FIG. 6.

FIG. 8 illustrates a side view of the crossbar assembly 30a, and FIG. 9 illustrates a cross section of the crossbar assembly 30a, taken about line AA of FIG. 8. FIG. 10 illustrates an exploded view of the crossbar assembly 30a. With reference to FIGS. 7-10, and continued reference to FIGS. 1-6, the isolator 38a is operable to partially decouple the structure interface 34a from the payload mount interface 36a and the damper 64 is operable to dampen the isolator 38a, thereby dampening vibrations propagating through the crossbar assembly 30a between the structure interface 34a and the payload mount interface 36a. Although the examples of FIG. 7-10 illustrate a single damper 64, in other examples a second damper may be located on an opposite side of the isolator 38a. Due to the spring portion 56, the isolator 38a can have a lower stiffness than the remaining components of the crossbar assembly 30a. The lower stiffness of the spring portion 56 results in the crossbar assembly 30a having a lower resonant frequency compared to a uniform crossbar of a higher stiffness material. Additionally, friction between the spring portion 56 and the damper 64 can dampen the magnitude of the resonance of the isolator 38a. The lower resonant frequency and reduced magnitude of vibrations can result in a reduction or damping of vibrations transmitted through the crossbar assembly 30a when the vibrations have a frequency higher than the resonant frequency.

The inner and outer rings 52, 54 of the isolator 38a can be configured to couple to the inner and outer crossbar segments 65, 60. The inner ring 52 can have an aperture 66 sized and shaped to receive at least a portion of either the inner or outer crossbar segments 65, 60. For example, the inner crossbar segment 60 can have a protrusion 68 having an outer diameter sized slightly smaller than an inner diameter of the aperture 66. Or in another example, the outer crossbar segment 60 can have a protrusion having an outer diameter sized slightly smaller than the inner diameter of the aperture 66. The crossbar segment can be secured to the inner ring 52 of the isolator 38a by inserting the protrusion 68 into the aperture 66 and securing with a fastener such as a bolt (not shown) extending through the inner ring 52 and into protrusion 68. The outer ring 54 can have features such as a threaded holes (not shown) for securing the other of the inner or outer crossbar segments 65, 60 to the outer ring 54. For example, the outer crossbar segment 60 can have a flange 61 having holes (not shown) corresponding to threaded holes of the outer ring 54. Fasteners, such as bolts (not shown), can extend through the holes and can be secured in the threaded holes of the outer ring 54 to secure the outer crossbar segment 60 to the outer ring 54.

The structure interface 34a can be part of the outer crossbar segment 60, which can be coupled to the isolator 38a through either the inner or outer ring 52, 54. The outer crossbar segment 60 can further comprise an outer isolator interface, such as the flange 61, operable to interface with at least a portion of the isolator 38a. The inner crossbar segment 65 can comprise an inner isolator interface for coupling to the other of the inner or outer ring 52, 54. In the example shown, the inner isolator interface comprises the protrusion 68, and the payload mount interface 36a, and thus the payload mount, can be coupled to the isolator 38a by way of the inner isolator interface of the inner crossbar segment 65.

Because the inner ring 52 and the outer ring 54 are each secured to one another by the spring portion 56, securing the inner ring 52 to the outer isolator interface and the outer ring 54 to the inner isolator interface joins the inner crossbar segment 65 to the outer crossbar segment 60 in a manner, such that the inner crossbar segment 65 and the outer crossbar segment 60 are moveable relative to one another in multiple degrees of freedom, or along/about multiple axes. The multiple degrees of freedom of relative movement can comprise three rotational degrees of freedom and three translational degrees of freedom. Indeed, the spring portion, by virtue of its lower stiffness, is operable to deform in response to certain loads to which it is tuned, thus allowing relative movement in multiple degrees of freedom between the outer crossbar segment 60 and the inner crossbar segment 65.

Damper 64 can be positioned between the inner ring 52 and the outer ring 54 and can be adjacent spring portion 56. Friction between the spring portion 56 and the damper 64 and/or friction between the damper and the inner and outer ring 52, 54 can dampen relative movement between the inner ring 52 and the outer ring 54. For example, damper 64 may be pressed against the spring portion 56 to provide friction between the damper 64 and the spring portion 56. In some example, the damper 64 may be pressed against the spring portion 56 by the inner crossbar segment 65. Or in another example, the damper 64 may be pressed between a radially outer surface of the inner ring and a radially inner surface of the outer ring. In some examples, the damper 64 can comprise a metal mesh. A metal mesh may be relatively stable with respect to temperature and provide a consistent amount of damping without dependence on the temperature. In another example, the damper 64 can comprise an elastomeric disk. The type of damper can be selected to provide a desired amount of damping, thus facilitating tuning of the crossbar assembly 30a. For example, the damping can be altered by using a metal mesh of different density or by using an elastomeric disk of different durometer.

The deformation of the spring portion 56 results in partially decoupling the outer crossbar segment 60 from the inner crossbar segment 65 and the damper dampens the movement of the spring portion 56. Together the isolator 38a and the damper 64 function to dampen vibrations propagating between the outer crossbar segment 60 and the inner crossbar segment 65.

The resonant frequency of the crossbar assembly 30a can be tuned for a particular application. Tuning can involve varying any one more parameters of the spring portion, such as its size, shape or configuration, and material makeup. Tuning can further involve varying the type, material, etc. of the damper 64. For example, selecting a spring portion 56 to comprise a size, shape or material makeup that provides a lower stiffness can result in a lower resonant frequency than selecting spring portion to comprise a size, shape or material makeup that provides a greater stiffness and higher resonant frequency. Additionally, the material properties of the damper 64 can be selected and varied, which can affect the amount of dampening provided by the crossbar assembly 30a. In addition, multiple dampers can be utilized, as mentioned herein.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A crossbar system facilitating isolation of a sensor assembly from external vibrations of a structure, the crossbar system comprising:
    a first crossbar assembly comprising a first structure interface operable to mount to a structure, a first payload mount interface operable to couple to a payload mount, a first isolator coupling the first structure interface and the first payload mount interface, and a first damper between the first structure interface and the first payload mount interface, the first isolator operable to partially decouple the first structure interface and the first payload mount interface and the first damper operable to dampen vibrations propagating through the first crossbar assembly;
    a second crossbar assembly comprising a second structure interface operable to mount to the structure, a second payload mount interface operable to couple to a payload mount, a second isolator coupling the second structure interface and the second payload mount interface, and a second damper between the second structure interface and the second payload mount interface, the second isolator operable to partially decouple the second structure interface and second first payload mount interface and the second damper operable to dampen vibrations propagating through the second crossbar assembly; and
    a payload mount coupled to the first payload mount interface and the second payload mount interface, the payload mount operable to mount a sensor assembly,
    wherein the first crossbar assembly further comprises a first outer crossbar segment coupled to the first structure interface and the first isolator, and a first inner crossbar segment coupled to the first payload mount interface and the first isolator, and wherein the second crossbar assembly further comprises a second outer crossbar segment coupled to the second structure interface and the second isolator, and a second inner crossbar segment coupled to the second payload mount interface and the second isolator, and
    wherein each of the first and second isolators comprise a inner ring, an outer ring concentric with the inner ring, and a spring portion coupling the inner ring to the outer ring.

2. The crossbar system of claim 1, wherein each of the first and second dampers comprise a metallic mesh adjacent the spring portion.

3. The crossbar system of claim 1, wherein each of the first and second dampers comprise an elastic disk adjacent the spring portion.

4. The crossbar system of claim 1, wherein the first inner crossbar segment is coupled to the inner ring and the first outer crossbar segment is coupled to the outer ring.

5. The crossbar system of claim 1, wherein the spring portion comprises a plurality of curvilinear members.

6. A crossbar assembly for facilitating isolation of a sensor assembly from external vibration of a payload system mount on a vehicle, the crossbar assembly comprising:

an outer crossbar segment comprising a payload mount interface operable to mount to a payload mount, and an outer isolator interface operable to mount to an isolator;

an inner crossbar segment moveable relative to the outer crossbar segment in multiple degrees of freedom, the inner crossbar segment comprising a structure interface operable to mount to a structure, and an inner isolator interface operable to mount to the isolator;

an isolator supported by the outer and inner crossbar segments, the isolator comprising a spring portion operable to deform in response to relative movement between the outer and inner crossbar segments, and an inner ring and an outer ring concentric with the inner ring, wherein the spring portion couples the inner ring to the outer ring;

a damper adjacent the spring portion; and wherein the isolator operates to partially decouple the outer crossbar segment from the inner crossbar segment and the damper operates to reduce vibrations propagating between the outer and inner crossbar segments.

7. The crossbar assembly of claim 6, wherein the inner ring is coupled to the outer isolator interface and the outer ring is coupled to the inner isolator interface.

8. The crossbar assembly of claim 6, wherein the damper comprises disk formed of a metallic mesh.

9. The crossbar assembly of claim 6, wherein the damper comprises an elastomer disc.

10. The crossbar assembly of claim 6, wherein the spring portion comprises a plurality of curvilinear members.

11. A payload system mount comprising:
a base structure;
a support structure rotatably coupled to the base structure;
a crossbar system supported by the support structure, the crossbar system comprising:
a first crossbar assembly comprising a first structure interface operable to mount to a structure, a first payload mount interface operable to couple to a payload mount, a first isolator coupling the first structure interface and the first payload mount interface, and a first damper adjacent the first isolator, the first isolator operable to partially decouple the first structure interface and the first payload mount interface and the first damper operable to dampen vibrations propagating through the first crossbar assembly;

a second crossbar assembly comprising a second structure interface operable to mount to the structure, a second payload mount interface operable to couple to a payload mount, a second isolator coupling the second structure interface and the second payload mount interface, and a second damper adjacent the second isolator, the second isolator operable to partially decouple the second structure interface and second first payload mount interface and the second damper operable to dampen vibrations propagating through the second crossbar assembly, wherein the first crossbar assembly further comprises a first outer crossbar segment coupled to the first structure interface and the first isolator, and a first inner crossbar segment coupled to the first payload mount interface and the first isolator, and wherein the second crossbar assembly further comprises a second outer crossbar segment coupled to the second structure interface and the second isolator, and a second inner crossbar segment coupled to the second payload mount interface and the second isolator, and wherein each of the first and second isolators comprise an inner ring, an outer ring concentric with the inner ring, and a spring portion coupling the inner ring to the outer ring; and a payload mount coupled to the first payload mount interface and the second payload mount interface, the payload mount operable to mount a sensor assembly; and a sensor assembly coupled to the payload mount, the sensor assembly comprising at least one sensor.

12. The payload system mount of claim 11, wherein each of the first and second dampers comprise a metallic mesh adjacent the spring portion.

13. The payload system mount of claim 11, wherein each of the first and second dampers comprise an elastomer disk adjacent the spring portion.

14. The payload system mount of claim 11, wherein the first inner crossbar segment is coupled to the inner ring and the first outer crossbar segment is coupled to the outer ring.

15. The payload system mount of claim 11, wherein the spring portion comprises a plurality of curvilinear members.

* * * * *